(12) United States Patent
Carmichael et al.

(10) Patent No.: US 7,913,919 B2
(45) Date of Patent: Mar. 29, 2011

(54) MULTI APPLICATION SMARTCARD WITH CURRENCY EXCHANGE, LOCATION, TRACKING AND PERSONAL IDENTIFICATION CAPABILITIES

(75) Inventors: Chris Carmichael, Laguna Hills, CA (US); Connie Carmichael, Laguna Hills, CA (US); Greg Crotty, Morris Planes, NJ (US)

(73) Assignee: International Apparel Group, Inc., San Juan Capistrano, CA (US)

( * ) Notice: Subject to any disclaimer, the term of this patent is extended or adjusted under 35 U.S.C. 154(b) by 0 days.

(21) Appl. No.: 12/536,117

(22) Filed: Aug. 5, 2009

(65) Prior Publication Data
US 2010/0065628 A1    Mar. 18, 2010

Related U.S. Application Data

(63) Continuation of application No. 09/493,756, filed on Jan. 28, 2000, now Pat. No. 7,588,180.

(51) Int. Cl.
*G06K 19/12*    (2006.01)

(52) U.S. Cl. ..................................................... 235/493
(58) Field of Classification Search ................. 235/380, 235/493
See application file for complete search history.

(56) References Cited

U.S. PATENT DOCUMENTS

| | | | | |
|---|---|---|---|---|
| 4,766,293 A | * | 8/1988 | Boston | 705/41 |
| 5,590,038 A | * | 12/1996 | Pitroda | 705/41 |
| 5,883,377 A | * | 3/1999 | Chapin, Jr. | 235/493 |
| 6,012,636 A | * | 1/2000 | Smith | 235/380 |
| 6,335,688 B1 | * | 1/2002 | Sweatte | 340/573.1 |

\* cited by examiner

*Primary Examiner* — Daniel A Hess
(74) *Attorney, Agent, or Firm* — Law Office of Scott C. Harris, Inc.

(57) ABSTRACT

A smart card capable of performing more than one function, said smart card comprising a first memory means comprising a first set of data to access a bank account, a second set of data to access a credit card account, a third set of data representing the identification of a holder of the smart card, and a fourth set of data to access telephone communication services. The smart card further comprises a microprocessor, said microprocessor being in electrical communication with a second memory means, and a location tracking means for determining a location of the smart card.

22 Claims, 11 Drawing Sheets

MULTI APPLICATION SMARTCARD WITH CURRENCY EXCHANGE, LOCATION, TRACKING AND PERSONAL IDENTIFICATION CAPABILITIES

FIELD OF THE INVENTION

The present invention relates to smart cards. In particular, the present invention relates to multi-application or multi-function smart cards and systems and methods for implementing multiple functions on a single smart card. More particularly the present invention relates to payment, banking, identification, location, and currency exchange systems using a smart card.

BACKGROUND OF THE INVENTION

Portable transaction cards with processing power, or so-called "smart cards" are being developed in the size of conventional plastic credit cards. These smart cards can include an embedded computer chip having processing power and memory (a microprocessor). Variants of these cards were described in the early 1970's by, for example, Moreno in U.S. Pat. No. 4,007,355, the entirety of which is incorporated herein by reference.

The International Standards Organization (ISO) has established a number of specifications for such electronic cards under the ISO/IEC Standards Series 7810, 7811, 7816, and 10536. A typical smart card includes a plurality of spaced apart electrical contacts on one surface which provide input and output interfaces with the microprocessor in the card. Cards compliant with ISO/IEC Standard 7816-series have contacts that interface with a terminal via ohmic contact ("contact" cards). Cards compliant with, e.g., ISO/IEC Standard 10536-series rely on close-coupling with a terminal ("contactless" cards). Some smart cards are now being produced with both types of contact schemes, i.e., they are compatible with terminals having contact interfaces or contactless interfaces.

The microprocessor utilized possesses the ability to hold an operating program and other information in volatile memory alterable by a CPU (Central Processing Unit), which possesses "hard-wired" control circuitry. The CPU and the various types of memory, including volatile and non-volatile memory, together comprising the microprocessor may all be contained by a single IC (Integrated Circuit) chip.

One application for smart cards is as an electronic purse or "stored value card." In this type of application, a prepaid amount of value or representation of currency is stored in the smart card memory for use in the place of conventional cash. In operation, the stored value card is inserted into a terminal device which communicates with the card through the contacts.

The terminal device may be, e.g., incorporated into a vending machine, cash register, or other point-of-sale device. Value equal to the amount of the purchase is passed from the consumer's card to the merchant terminal or to a central clearing and authorization system so the merchant or vendor may be credited with the appropriate amount of value. Correspondingly, the amount of available currency in the consumer's card is reduced by the amount of the purchase. These stored value applications are becoming more widely used in the U.S and throughout the world. Currently primary applications in which stored value cards are used include purchases at vending machines, telephones, gasoline pumps, and other point of sale devices in which the goods or services purchased are low dollar value items.

Stored value card systems are operated as both "open" or "closed" systems. "Closed" systems are limited to specific participating merchants. For example, some universities offer stored value cards to their students for use in university cafeterias and book stores. The cards are not compatible with point of sale devices or terminals outside of the university. These "closed" systems are easier to implement from a technical and security perspective because of this closed universe of uses. "Open" systems, on the other hand, allow use of the card at substantially any merchant who has a compatible point of sale device or card reader. In many respects, "open" stored value card systems are preferable to "closed" systems, as they allow the cards to be used in a wide variety of places, for various types of purchases. "Open" systems, however, are more difficult to implement and have more rigorous security requirements.

As these stored value cards become more widely available, it is desirable that they be capable of additional functions that are useful for smart card carriers and that are not now available. Drawbacks in present technology include the need to carry various cards for use as credit cards, identification cards, phone cards, and smart cards. The present invention solves this problem and other problems by providing a multi-application/function smart card that can be used as a cash/debit card, a credit card, a phone calling card, an ATM card, and an identification card. The present invention therefore eliminates the need for consumers to carry more than one card with them at all times.

Another benefit achieved by eliminating the need to carry multiple cards is that several different credit, banking, and telephone service operating institutions need not be contacted when the card is lost or stolen. Only one institution need be contacted to disable the card. Moreover, once a credit card is lost or stolen, it can be virtually impossible to ever find it again. The present invention solves this problem by coupling a GSM chip or signal transmitter to the smart card for use in connection with a Global Positioning System (GPS) satellite network or the like, to locate the smart card. This system can also be used to locate holders of the card who are missing.

Another disadvantage of current credit and smart cards is that it is currently very difficult to automatically transfer funds from one institution to another. For example, there is no way of conveniently transferring funds from your ATM card to your phone card or transferring funds from your credit card to your electronic "smart card purse" or ATM account. The present invention solves these problems because all functions are on one card, and with that card, funds can be transferred from one account to another.

Many credit card companies today offer some sort of rewards plan for using the credit card to purchase goods or services. The problem is that consumers have so many different cards that accumulating a meaningful number of points or credits from any one institution is difficult. The present invention solves that problem because rewards are accumulated from use of any of the functions of the multi-application/function smart card. Thus, whether the cardholder uses it as an ATM card, a phone card, a credit card, or a debit card, he/she is credited with rewards that can be used to obtain valuable goods and services.

Another disadvantage of current credit and smart cards is that they are incapable of altering the currency of the stored value. The present invention solves this problem by providing a program associated with the smart chip, which can automatically communicate with a central source of currency exchange rate information for converting in real time the currency of the stored value and for generating and providing a current exchange schedule for currencies of any nation.

Therefore, travelers can easily and conveniently use their smart cards in foreign countries and can even obtain currency exchange information by using their smart card.

Other limitations of known smart cards and credit cards is that they are not capable of categorizing, automatically storing, and generating information for multiple accounts in real time as transactions occur. The present invention solves this problem by coupling an IC to the card, which can store data about various kinds of transactions as they occur, and that data can be recalled at a later time to generate charts, spread sheets, schedules, account statements, and account summaries. Moreover, the IC of the present invention has this capability for all of the functions of the smart card, including the credit, debit, telephone, ATM, GPS, and identification functions. This information can be extremely useful for immediately accessing account information as well as movement history through the GPS system. Thus, for example, the present invention allows a traveler to generate a map or a travel log of where he/she has been for a predetermined length of time.

SUMMARY OF THE INVENTION

In one particularly innovative aspect, the present invention is directed toward a smart card capable of performing more than one function. The said smart card comprises a first memory means having a first set of data to access a bank account, a second set of data to access a credit card account, a third set of data representing the identification of a holder of the smart card, and a fourth set of data to access telephone communication services. The smart card may further have a microprocessor, which is in electrical communication with a second memory means. The smart card also may have a location tracking means for determining a location of the smart card.

The first memory means can be a magnetic strip which can hold one or more of the following information: data representing a number for accessing a bank account, such as a bank account number; data representing a number for accessing a credit card account, such as a credit card number; data representing a number for accessing telephone communication services, such as a telephone calling card; and data representing the identification of the holder of the smart card, such as the holder's name, address, social security number, mother's maiden name, birth date, physical characteristics, and any other identification number.

The second memory means may comprise non-volatile memory, such as EPROM, EEPROM or RAM or ROM. The second memory means is for storing data representing an amount of cash, or a program for enabling the microprocessor to track a history of cash transactions made using the smart card and to generate a cash transaction history or account activity statement, and charts and graphs based on account activity. The second memory can also store a program for enabling the microprocessor to automatically convert a cash value from one currency to another currency based on the location of the smart card, i.e., the country in which the smart card is being used or is located.

The location of the smart card can be determined using the location tracking means which can reside on the smart card. In one embodiment the location tracking means transmits an identifiable signal, which is detectable by a global positioning system satellite. Alternatively, the location of the card can be determined by a central processing center which stores data relating to all of the functions of the smart card, and which can identify the location of the card by identifying the location of the retail terminal or card reader to which the smart card is applied.

In one embodiment the central processing center can be accessed by the smart card by coupling the microprocessor located on the smart card to a reader coupled to a computer linked to the central processing center. The central processing center may also be accessed by telephone or global computer network, such as the Internet. The location tracking capabilities of the smart card are particularly useful for when the smart card is lost or stolen, or when a person holding the smart card needs to be located. The location tracking capabilities also make it possible for the smart card holder to generate a travel log or a map of the locations in which he has traveled while carrying the card.

The smart card of the present invention enables the holder to transfer funds from one application of the card to another with convenience and ease. Thus, electronic cash stored in the microprocessor chip of the smart card can be funded by transferring funds from, for example, a credit card source or a bank account (ATM function), either of which can be accessed through the magnetic strip, to the microprocessor chip. Alternatively, electronic cash funds from the smart card microprocessor chip can be transferred, for example, to a credit card source, a telephone calling card source, or a bank account, any of which can be accessed through the multifunctional magnetic strip.

In another particularly innovative aspect, the multiple functions of a smart card are stored on two magnetic strips. The two magnetic strips can be on opposite sides of the smart card along the length of the smart card. One of the magnetic strips can store data relating to the telephone calling card function and ATM function, while the other magnetic strip can store data relating to the credit card function and the identification function. The information on the first magnetic strip can be accessed by sliding that magnetic strip through a card reader, or by inserting the card from the proximal or front end of the card. The information on the second magnetic strip can be accessed by sliding that magnetic strip through a card reader, or by inserting the card form the distal or back end of the card. This is a particularly novel way of utilizing space on a credit card to store and access data.

This embodiment of the smart card can also have a microprocessor chip embedded in the smart card for storing programs capable of converting currency, storing account activity information, generating graphs, charts, and statements relating to the account activity, and generating travel logs and maps based on the location history of the smart card.

In another innovative aspect, the invention is directed to a method of gaining access through an access device upon payment of a value using a smart card comprising a microprocessor in electrical communication with a memory and a location tracking means. The method can comprise the steps of providing a smart card comprising a first memory means comprising a first set of data to access a bank account, a second set of data to access a credit card account, a third set of data representing the identification of a holder of the smart card, and a fourth set of data to access telephone communication services. The smart card can further comprise a microprocessor being in electrical communication with a second memory means, and a location tracking system on the smart card. Other steps of the method can include operatively coupling the smart card to the access device, reading at least of the four sets of data, performing a first authentication process on said at least one set of data, and permitting access if said step of performing a first authentication process meets a required condition.

In another innovative aspect, the present invention is directed to a system for locating the position of a smart card. The system can comprise a smart card having a microprocessor in electrical communication with a memory means, and a location tracking means. The system can further comprise a satellite in duplex communication with the location tracking means, and a central processing center in duplex communication with the satellite. The satellite can be a global positioning system satellite or any other communications satellite. The central processing center can be capable of receiving coordinate data from the satellite to determine the location of the smart card. The location tracking means on the smart card can also be capable of receiving coordinate data from the satellite and transmitting the data to the memory. The memory can comprise a program for enabling the coordinate data to global position and to store said data in the memory.

In another innovative aspect, the present invention is directed to a system of converting a known value of a first currency to a known value of a second currency. The system may comprise a smart card having a microprocessor in electrical communication with a memory means, a central processing center comprising a computer having real time data comprising the value of said first currency in relation to said second currency, and communication means between the smart card and the central processing center. The communication means can be a telephone line, a satellite link, an internet based connection, or a wireless communications system connection.

Another innovative aspect of the invention relates to a method of providing rewards to smart card holders for using any of the multiple functions capable of being performed by the smart card. The method comprises the steps of providing a smart card having a plurality of functions, and providing a holder of the smart card with value in increments each time any of the functions of the smart card is used to purchase a good or service.

BRIEF DESCRIPTION OF THE DRAWINGS

Reference is next made to a brief description of the drawings, which are intended to illustrate a multi-application smart card and methods and systems of using same. The drawings and detailed descriptions which follow are intended to be merely illustrative and are not intended to limit the scope of the invention as set forth in the appended claims.

DETAILED DESCRIPTION OF THE PREFERRED EMBODIMENT

Figure 1:
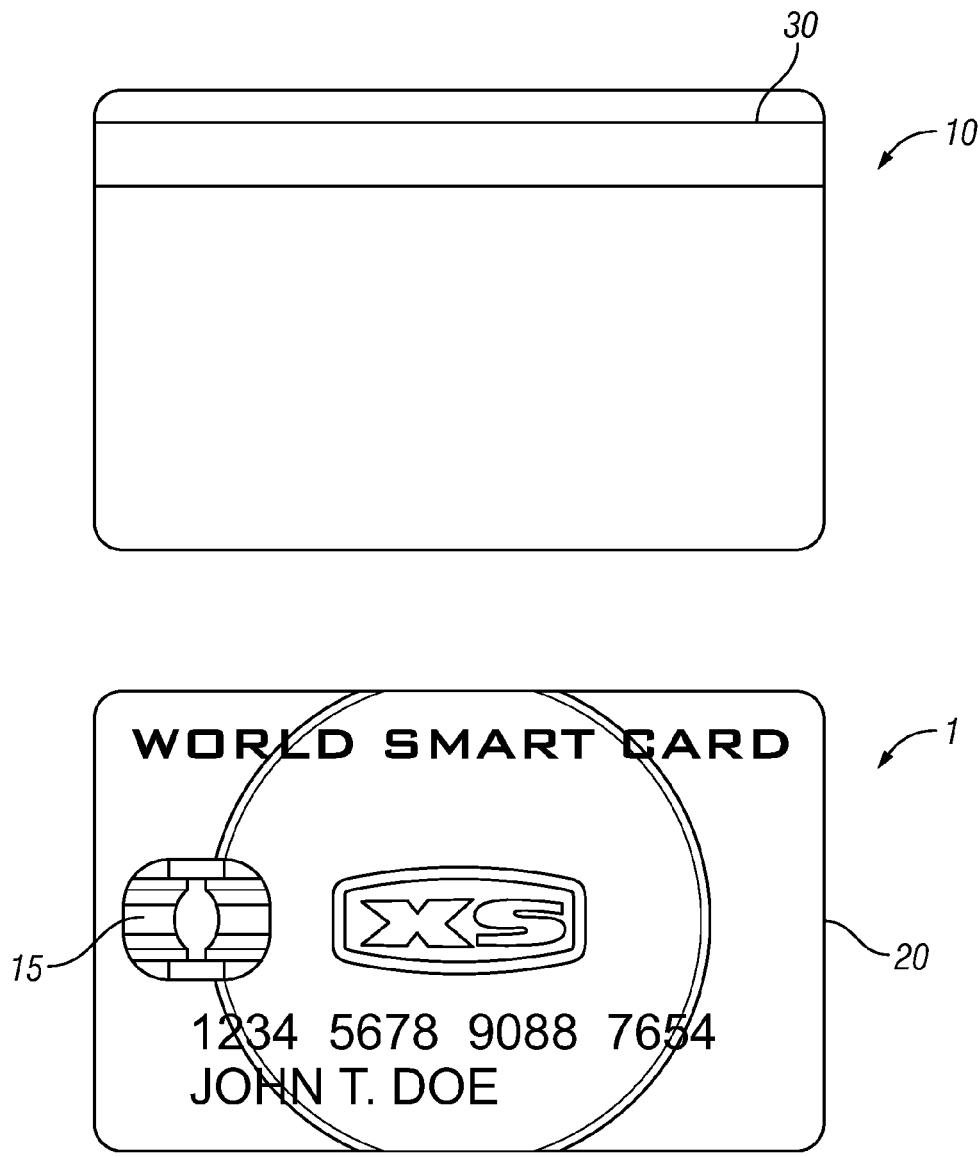
FIG. 1 is an illustration of the front and back of a multi-application smart card in accordance with the present invention.

FIG. 1 illustrates a smart card 1 of the present invention. The components of the smart card 1 are an account number 20, a magnetic strip 30 containing information for performing multiple functions, and a smart card chip 15 (integrated circuit (IC)). The smart card chip 15 is made up of a microprocessor, a card reader interface, a RAM, a ROM, a non-volatile memory, and a cryptographic module (none of which are shown, but all of which are known in the art).

Figure 2:
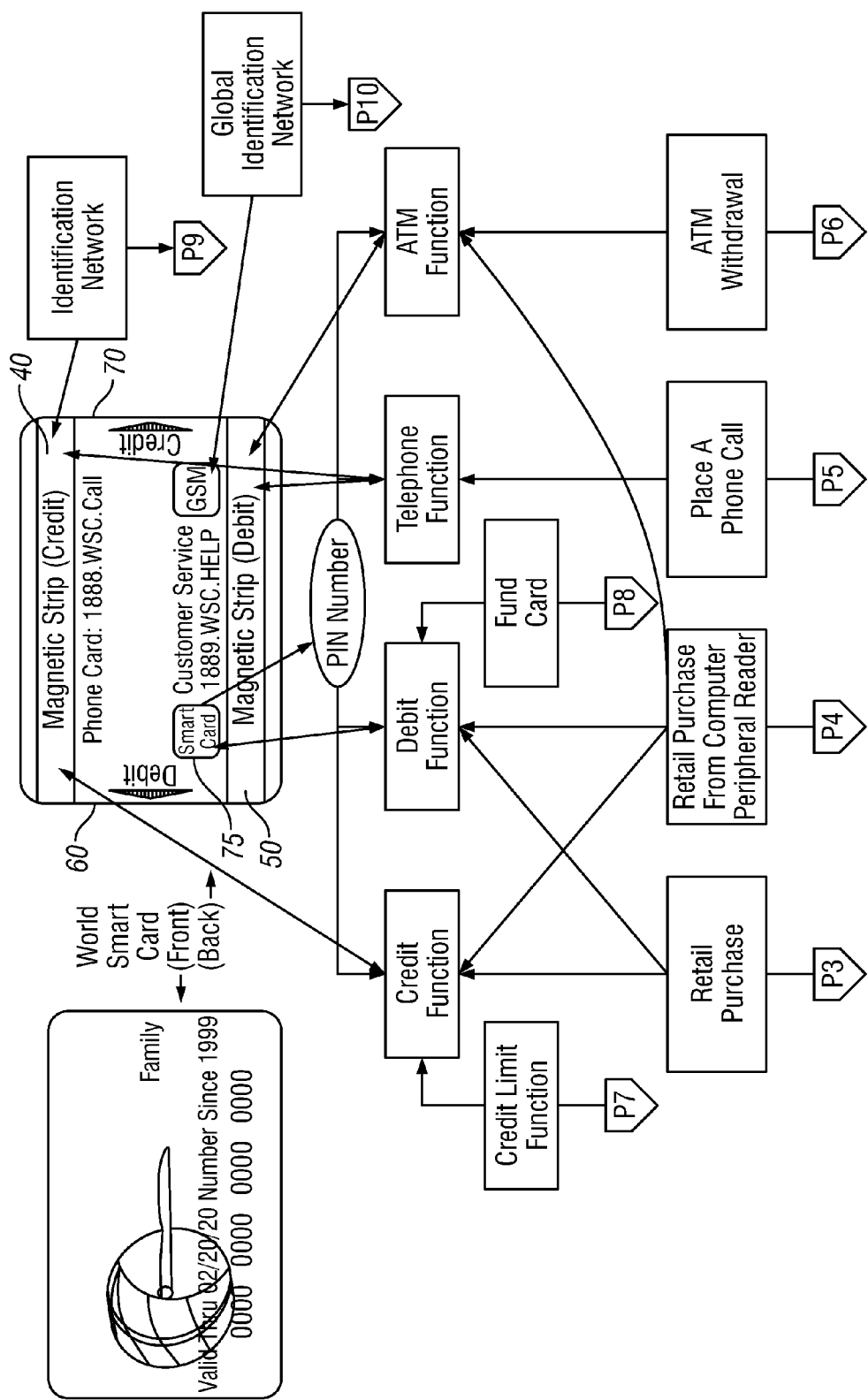
FIG. 2 is a block diagram of a multi-application smart card method and system illustrating an alternate embodiment of the smart card.

FIG. 2. shows a smart card having a smart chip 75 and dual magnetic strips 40 and 50. The first magnetic strip 40 functions as a credit card, a telephone calling card, and an identification card. The second magnetic strip 50 functions as an ATM card, and also as a telephone calling card. The functions on the first magnetic strip 40 can be accessed by swiping magnetic strip 40 through a card reader. Likewise, the functions of the second magnetic strip 50 can be accessed by swiping magnetic strip 50 through a card reader. For card readers that require insertion of the entire credit card, information on the magnetic strip 50 is accessed by inserting the smart card 1 proximal end 60 first. Likewise, information on the magnetic strip 40 can be accessed by inserting the smart card 1 distal end 70 first.

Figure 3:
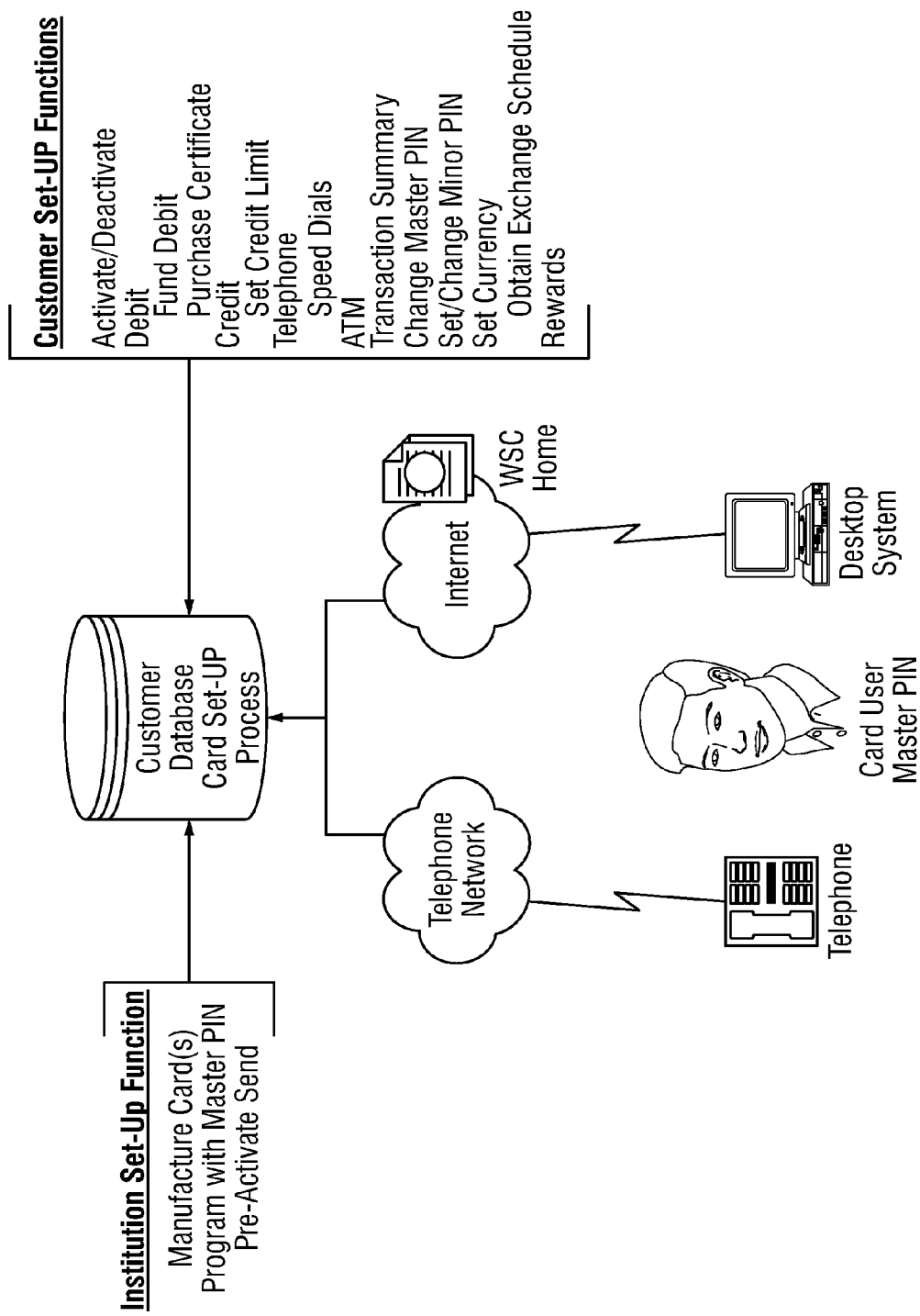
FIG. 3 is an illustration of a method and system of setting up and activating the smart card of the present invention.

As shown in FIG. 3, the smart card 1 comes preset from the institution with a master PIN number. Additional cards can be generated to meet the needs of the family. The cardholder ca activate the card via telephone or computer system via modem. The cardholder can configure his/her card, again, by telephone or through the institution's website. All of the information is stored on a customer database controlled by the institution. The functions which can be accessed are the activation/deactivation function, the debit function, the credit function, the telephone calling card function, the ATM function, transaction summary function for any and all transactions accomplished using the card, setting master and minor PIN numbers, setting the currency, obtaining currency exchange schedules, and the Rewards function.

Figure 4:
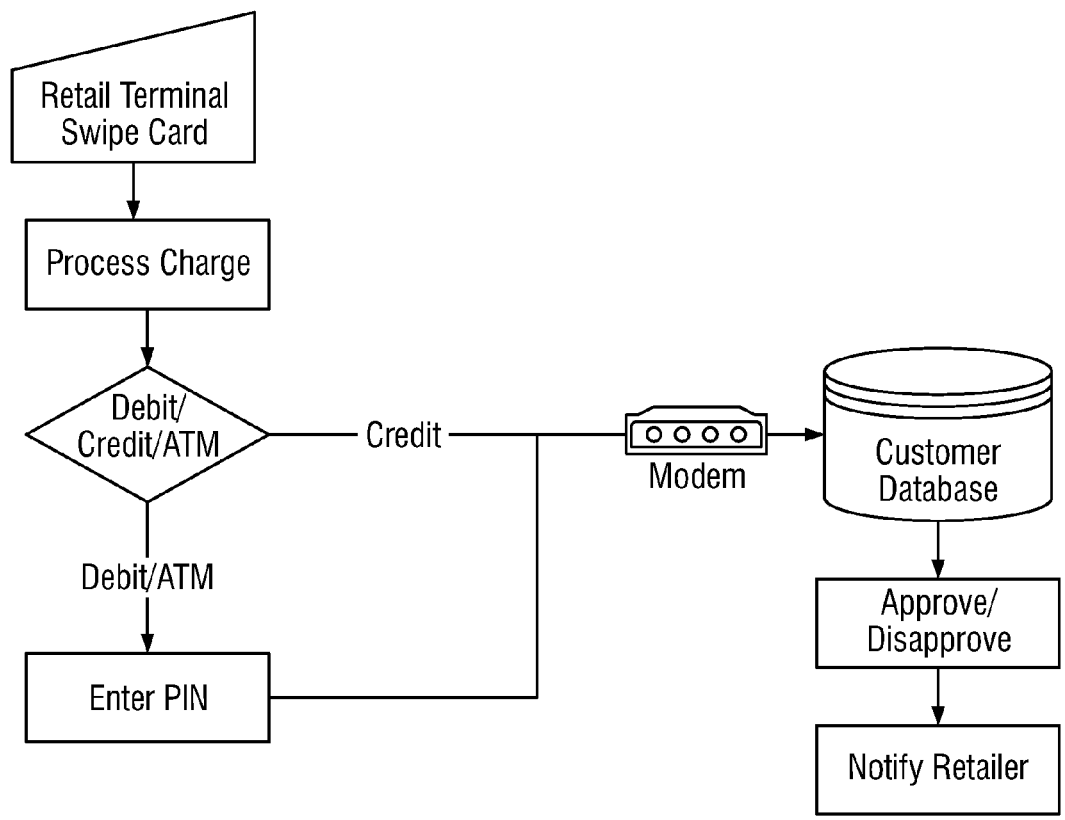
FIG. 4 is a flow chart describing a method and system of using the smart card of the present invention in connection with a retail terminal.

Thus, as shown in FIG. 2, a retail purchase can be accomplished with either the credit card function, the ATM function, or the debit function. As shown in FIGS. 2 and 4, the once the card is swiped through a card reader, any of those three functions can be accessed (depending on the direction of the swipe or the magnetic strip that is swiped) to make a purchase. The charge is communicated by modem to a customer database or central processing center, which either approves or disapproves the purchase and notifies the retailer of the status of the purchase. In this embodiment, a PIN number must be entered in order to access the debit and ATM functions, whereas the credit function does not require a PIN number. As explained herein, however, the PIN number can be associated with any one, all, or a combination of the functions available on the card.

The debit function of the smart card 1 is activated by a card reader that is capable of communicating with the smart chip 75 through the card reader interface on the chip. A card reader capable of interfacing with the chip 75 can be located anywhere, including retail stores, or linked to a computer at home or at work. The debit function accesses data or a microprocessor associated with a program stored on the smart chip 75. When a purchase is made using the debit function, the microprocessor automatically reduces the funds stored on the smart chip 75 by the amount charged by the retail establishment. A computer peripheral smart card reader can be used to make purchases over a global computer network, such as the Internet.

Figure 5:
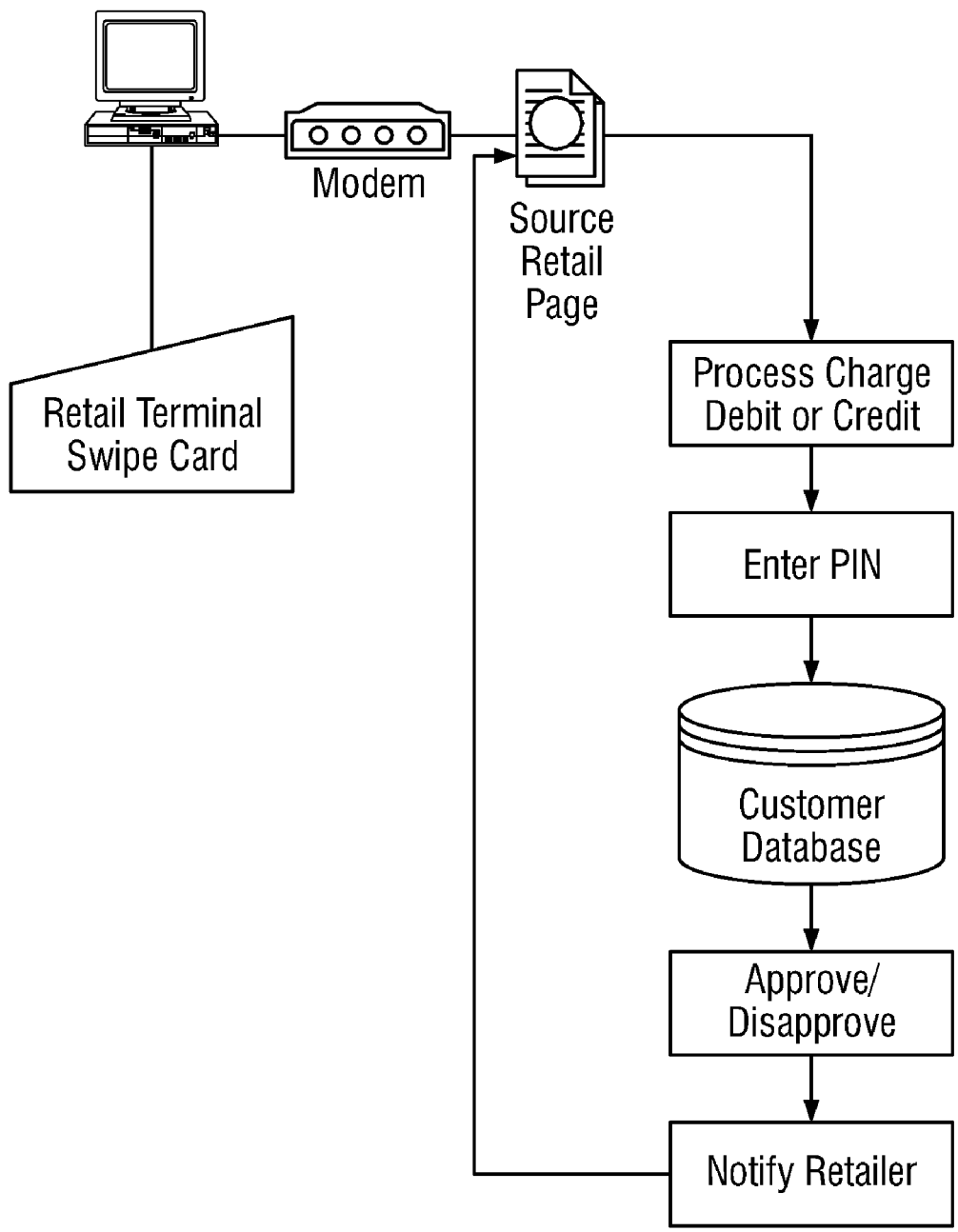
FIG. 5 is a flow chart describing a method and system of using the smart card of the present invention in connection with a computer peripheral reader.

Retail purchase from a computer peripheral reader through a global computer network is shown in FIG. 5. As described herein, use of the debit function will automatically reduce the amount of electronic currency stored on the smart chip 75, whereas use of the ATM and credit functions will reduce the amount of funds associated with the cardholder's bank and credit card accounts respectively. The smart chip 75 stores a digital certificate unique to each cardholder. When the card is placed in the peripheral reader, the cardholder enters his or her PIN (Set-up once with billing information in Microsoft IE 4, for example), the digital certificate is read by the peripheral reader and the online wallet can be unlocked, thus allowed the debit, credit or ATM function to be used depending on need. Thus, secure Internet purchases can be made using the debit function because no account information need be transmitted every time a purchase is made.

Alternatively, the smart card can be used to make telephone calls using the telephone calling card function or as an identification card to identify the holder of the card. As described herein, A PIN number is associated with the smart card 75 chip. The PIN number can be required to activate any one of the functions, all of the functions, or a combination of some of the functions. Thus, a cardholder who prefers to protect only the debit and ATM functions, for example, can set up the smart card 75 to require a PIN number before each use of any of those functions.

Figure 6:
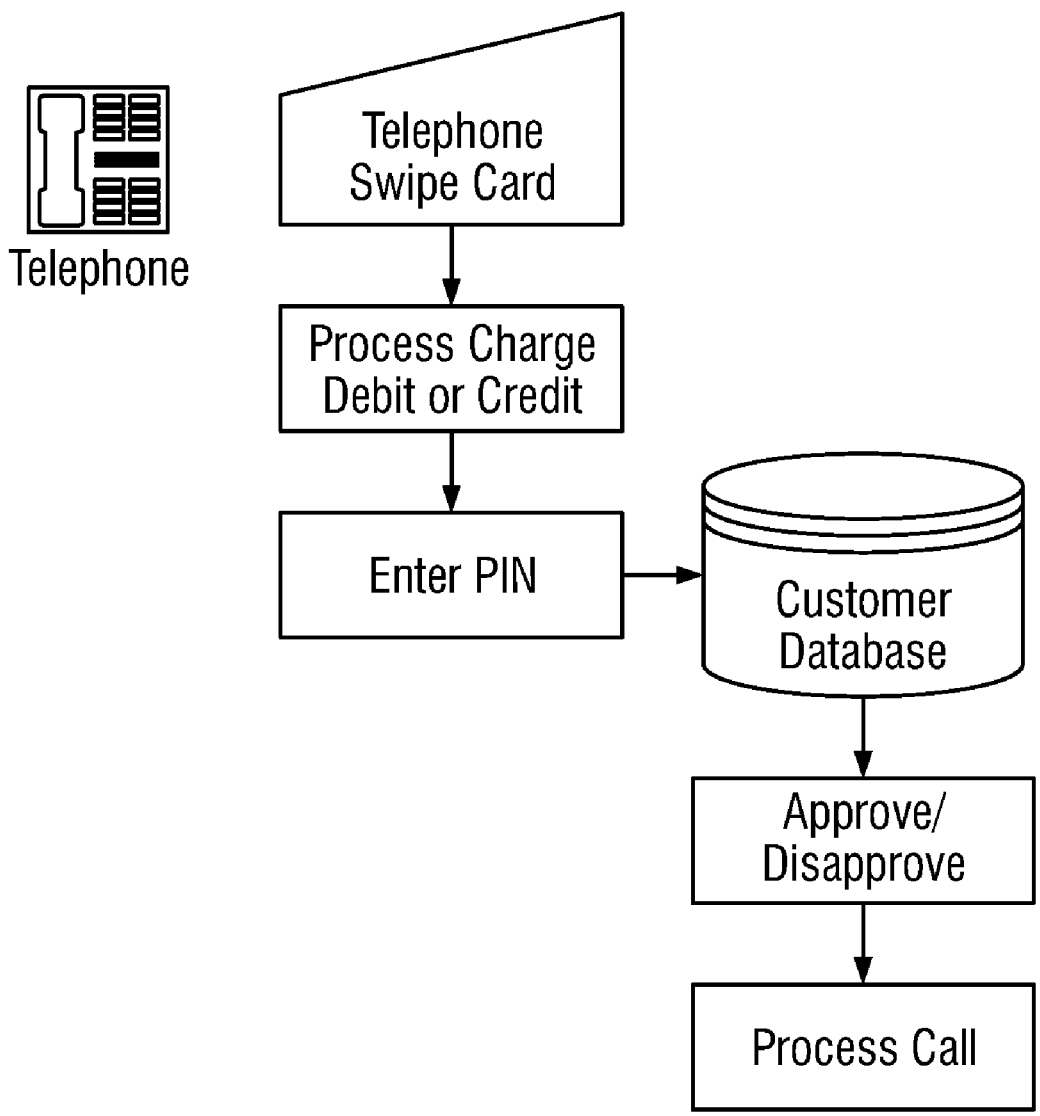
FIG. 6 is a flow chart describing a method and system of using the smart card of the present invention to make a phone call.

The telephone calling card function is shown in FIG. 6. It can be appreciated that the cardholder's account number can be entered by contacting a phone company and dialing the smart card 1 account number 20 rather than swiping the card through a reader.

Figure 7:
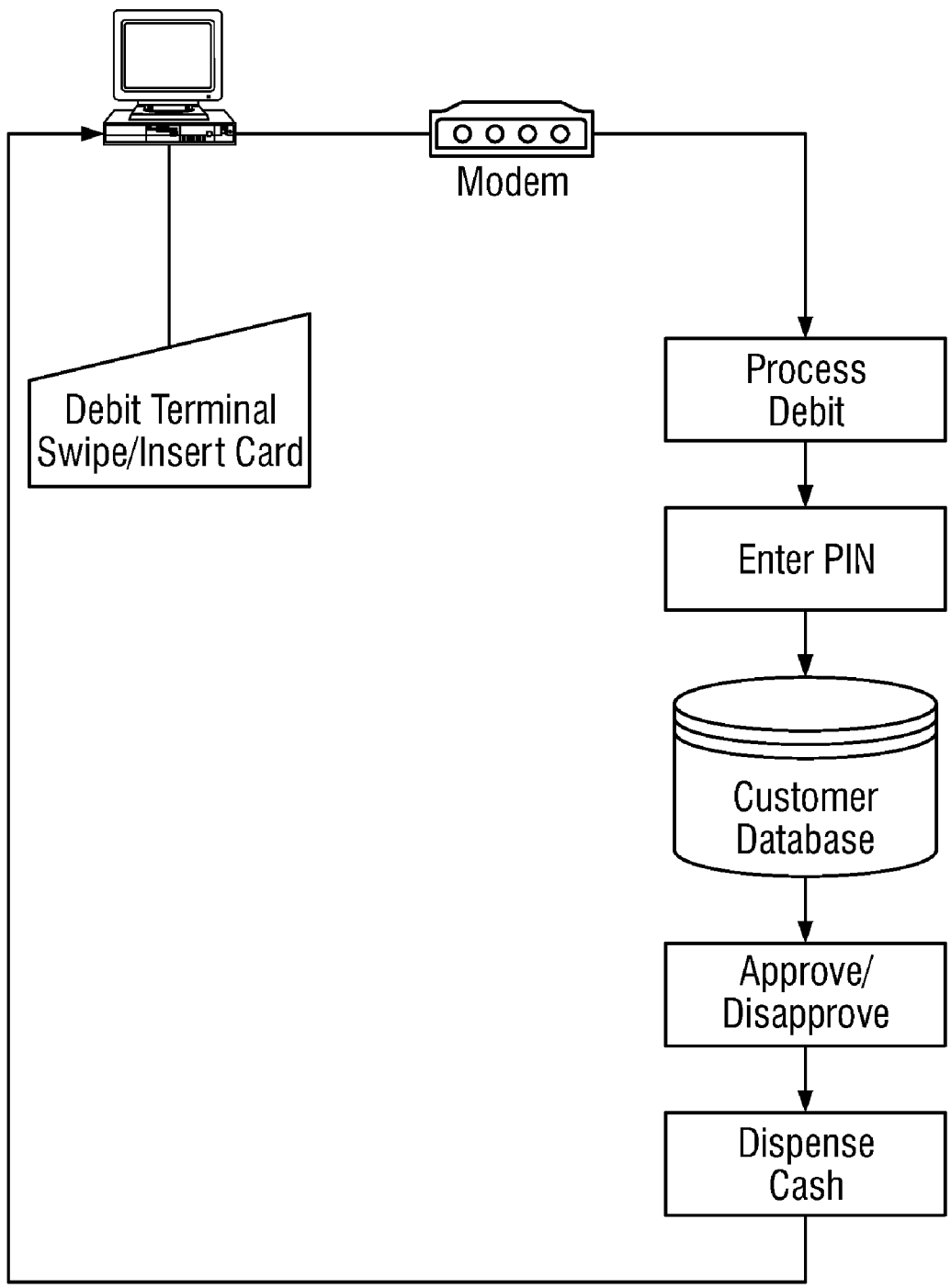
FIG. 7 is a flow chart describing a method and system of using the smart card of the present invention in connection with an automated teller machine (ATM).

The ATM function is shown in FIG. 7. The ATM function can be used by inserting the card ATM terminal or swiping magnetic strip 50 through an ATM card reader. The smart card 1 can be used, for example, with any Interac® networked automated teller device worldwide. This function can be used to access cash through an automated teller machine, purchase goods or services as described herein, or to transfer funds from a bank account, line of credit, or equity account to fund either the credit card account associated with the magnetic strip 40 or the electronic cash associated with the smart card chip 75. The ATM card can also be used to make telephone calls.

Figure 8:
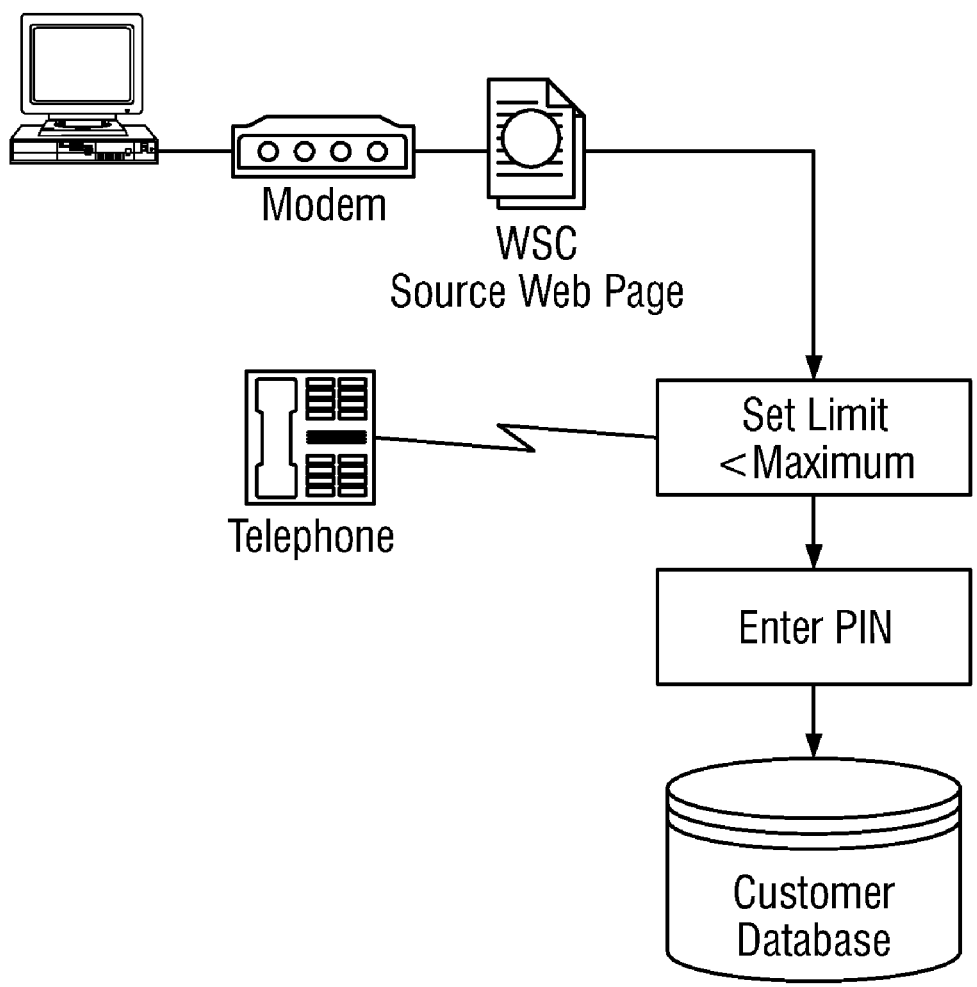
FIG. 8 is a flow chart describing methods and systems of altering the credit limit of the smart card of the present invention.

Another innovative feature of the smart card is that it has a credit limit function as shown in FIGS. 2 and 8, which can be used to set the credit limit maximum associated with the credit card function. This function is particularly useful because it can be used to reduce the amount of liability in case the card is lost or stolen. The limit set by the cardholder can be superceded by the cardholder by entering the PIN number as long as the overall credit limit is not exceeded.

Figure 9:
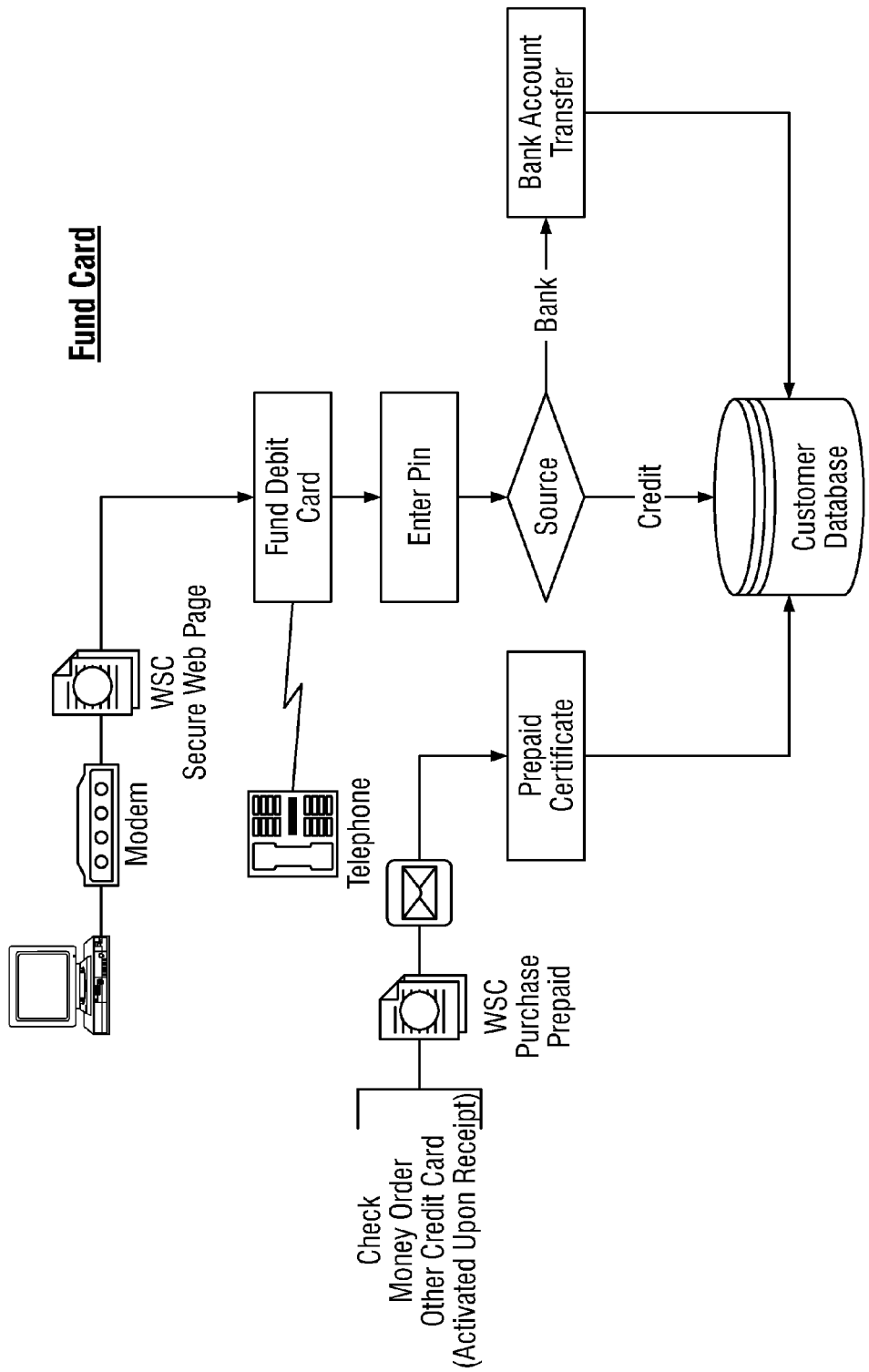
FIG. 9 is a flow chart describing methods and systems for funding the smart card of the present invention.

As shown in FIG. 9, the multi-application architecture of the smart card 1 makes it possible to transfer funds between several accounts using just the smart card 1. The electronic cash stored on the smart card chip 75 can be funded by transferring funds from either the credit card account or the ATM card account. This can be done either by telephone, by way of a website organized by the smart card institution to service cardholders. Prepaid certificates, as shown in FIG. 9, can also be used to fund the debit function of the card. Prepaid certificates can be purchased with a personal check, money order or credit card.

Alternatively, the smart card 1 can be used to transfer funds from the electronic cash debit function to the credit or ATM functions through the institution's database. Because all relevant account information relating the credit, ATM, debit, and telephone calling functions are contained in the institution's database, the smart card 1 is the only card required to transfer funds as between the accounts that are accessed by the functions on the two magnetic strips 40 and 50 and the smart chip 75.

Figure 10:
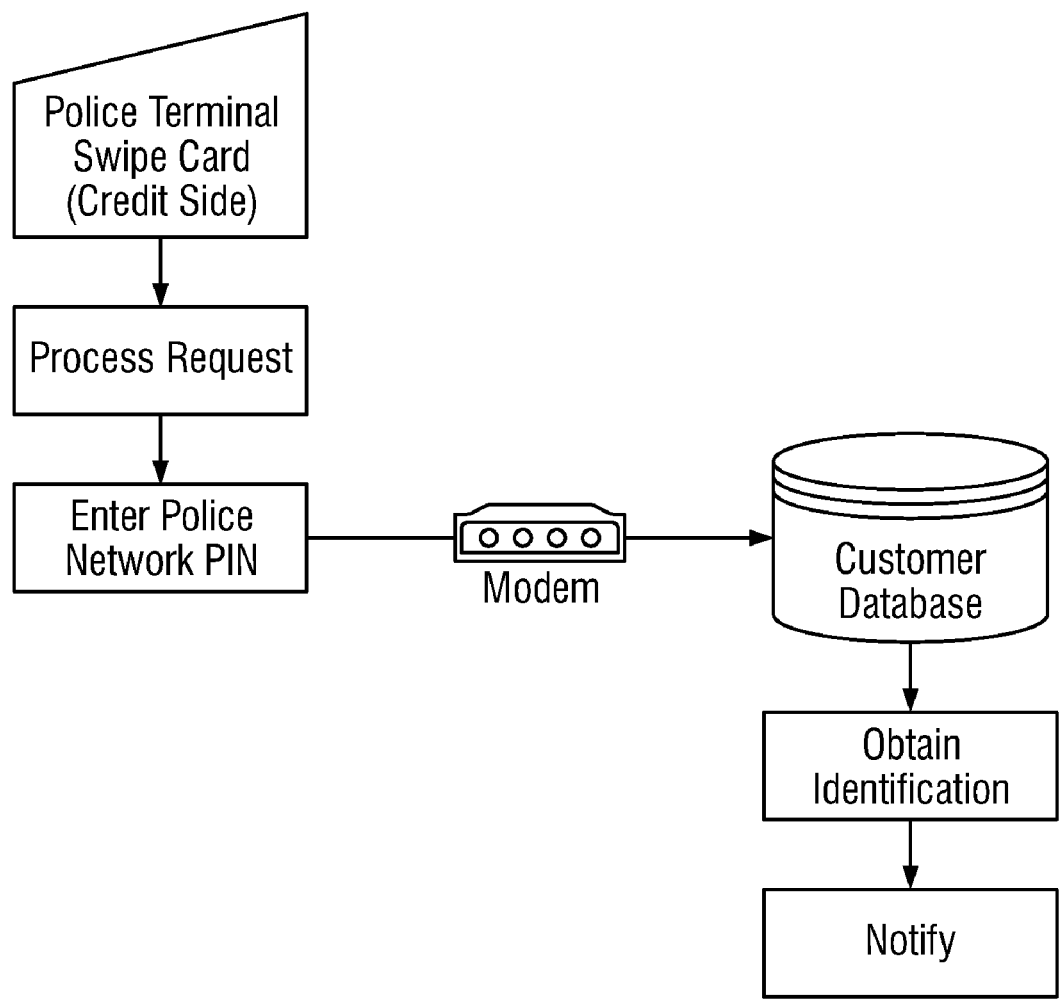
FIG. 10 is a flow chart describing a method and system for identifying the holder of the smart card of the present invention.
Figure 11:
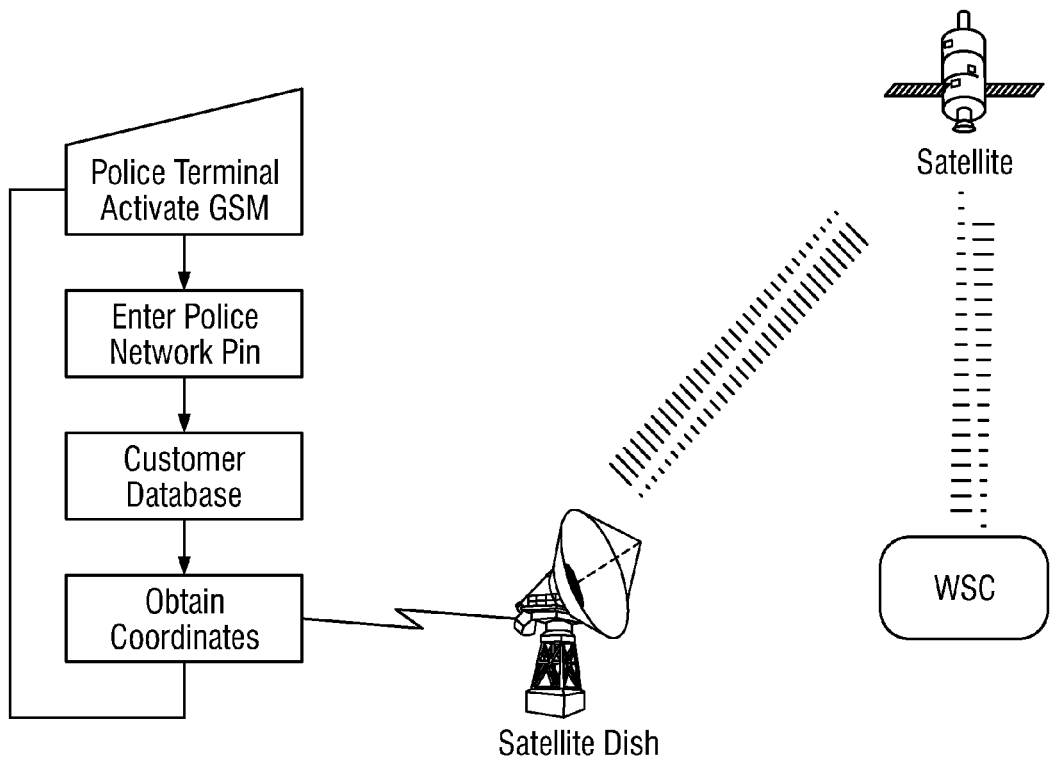
FIG. 11 is a flow chart describing a method and system for locating the position of the smart card of the present invention.

As shown in FIG. 10, the card is also offered as a device to identify an individual who is a smart card 1 holder. Through a police network, and a police-issued PIN number, magnetic strip 40 can be swiped through a network device. The database of the smart card's institution is accessed and sends back pertinent information and contacts to identify the holder of the smart card. Alternatively, the magnetic strip 40 itself will have the identification information encoded thereon.

Also found on the smart card 1, as shown in FIG. 2, is a GSM (Global System Mobile Communications) chip. The GSM can either be activated by a police network terminal as described in FIG. 10, or through a signal transmitter that is contained on the GSM chip itself. If used by way of a police tracking system, the card is coupled to a police terminal, which is capable of interfacing with the GSM chip. The police terminal is in duplex communication with a satellite, such as a global positioning system satellite. The satellite relays location information back to the institution. Thus, individuals holding the card can be identified with the identification function and located using the location tracking function of the GSM.

Another type of location tracking function utilizes a device coupled to the card which transmits a unique signal which is detectable by a satellite, such as a global positioning system satellite. The global positioning system satellite is in duplex communication with the transmitter, which is in electrical communication with a memory associated with the microprocessor on the smart chip 75. The satellite sends coordinate or location data to the transmitter, which relays the information to the microprocessor. The program enables the microprocessor to process the coordinate data received from the satellite, to store said data in a non-volatile memory, and to generate a travel log based on said data. The program also enables the microprocessor to generate a map of all of the global positions in which the smart card 1 has been located over a predetermined length of time. This information can be used by the holder of the smart card 1 to review all of the places he or she has been during a predetermined period. All of this information can be downloaded through a computer peripheral reader to a computer and viewed on a computer screen or printed out. Alternatively, all of the location information can be relayed to the institution issuing the smart card and can be stored by the institution for retrieval by computer or telephone access by the cardholder.

Another aspect of the invention relates to currency exchange as described in FIG. 3. The memory associated with the smart card chip 75 has stored therein a program for enabling the microprocessor to automatically convert a predetermined cash value from a first currency to a second currency. The first currency can be previously set by the cardholder either by telephoning the institution or configuring the functions of the smart card 1 through the institution's website, as shown in FIG. 3. The second currency is automatically set in real time by the program, which is in communication with the location tracking means described herein. The program determines the location of the smart card 1 through the location tracking means, determines what country is associated with that location, and sets chooses the currency of that country as the currency to which the first currency will be converted.

Alternatively, the location tracking means sends location information to the card issuer institution's database, which determines the location of the smart card 1 and converts all currency in its databases to that of the country in which the smart card is located. Thus, when a cardholder attempts to use the card or obtain a balance of any account associated with the smart card 1, the balance will be represented in the currency of that country. This currency conversion function can be deactivated by the cardholder by requesting deactivation through either telephone or the institution's website.

The location of the smart card 1 can also be determined at the time the smart card 1 is used by identifying the location of the retail terminal, automated teller machine, or peripheral card reader. Thus, when a debit, telephone, ATM, or credit function is processed and the institution's database is accessed, the institution will be capable of recognizing the location of the card based on the retail terminal, automated teller machine, or peripheral card reader from which the request originates and setting the conversion of currency based on that information.

While the invention is susceptible to various modifications and alternative forms, specific examples thereof have been shown by way of example in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

The invention claimed is:

1. A device, comprising:
a credit card package, having at least a first surface allowing coupling said credit card into a specified receiving element to read information from the credit card, and having at least two readable areas that are each readable from a surface of the credit card, wherein said readable areas include a first reading strip on a first portion of the credit card package, and a second reading strip on a second portion of the credit card package, where the first reading strip is located in a location so that said first reading strip is read from the credit card when the credit card is coupled in said receiving element in a first orientation, and the second reading strip is read from said credit card when the credit card is coupled in said receiving element in a second orientation, and wherein the first reading strip has data for a first function, and the second reading strip has data for a second function different from the first function, wherein said first reading strip functions as a credit card, and said second magnetic strip functions as an ATM card, further comprising a password stored within said device, where said password restricts certain operations of said device, and further comprising a processor in said credit card package, which controls operations of said device, and wherein said processor allows said device to be used to function as an ATM card only when said password is entered, but allows said device to be used for other functions without entering said password.

2. A device as in claim 1, wherein said first reading strip is at a top of the package in an area where the package would be scanned in a first orientation, and said second reading strip is at a bottom of the package, in an area where the package would be scanned when turned completely upside down from said first orientation into a second upside down orientation.

3. A device as in claim 1, wherein at least one of said first and second magnetic strips also functions as a telephone calling card.

4. A device as in claim 1, wherein a magnetic strip also functions as an identification function.

5. A device as in claim 1, wherein said password is a personal identification number.

6. A device as in claim 1, further comprising an electronic device, where said electronic device stores data associated with use of the device.

7. A device as in claim 6, wherein said electronic device stores a balance.

8. A device as in claim 7, wherein said balance in said device is automatically converted to a different currency.

9. A device as in claim 6, further comprising an automatic position detecting part, which automatically detects a position of said device.

10. A device as in claim 9, wherein said electronic device automatically stores a balance that is in said device, and adjusts said balance based on card usage.

11. A device as in claim 1, wherein said reading strips are magnetic strips.

12. A method as in claim 1, wherein at least one of said first and second reading strips also functions as a telephone calling card.

13. A method as in claim 12, wherein a reading strip also functions as an identification function.

14. A method as in claim 1, further comprising requiring a password in order to use said functions.

15. A method as in claim 14, wherein said password is a personal identification number.

16. A credit card package, having at least a first surface allowing coupling said credit card into a specified receiving element to read information from the credit card, and having at least two readable areas that are each readable from a surface of the credit card, wherein said readable areas include a first reading strip on a first portion of the credit card package, and a second reading strip on a second portion of the credit card package, where the first reading strip is located in a location so that said first reading strip is read from the credit card when the credit card is coupled in said receiving element in a first orientation, and the second reading strip is read from said credit card when the credit card is coupled in said receiving element in a second orientation, and wherein the first reading strip has data for a first function, and the second reading strip has data for a second function different from the first function, further comprising an electronic device in said credit card housing that stores a balance, and wherein said electronic device automatically reduces said balance when said credit card is used.

17. A device as, comprising:
a credit card package, having at least a first surface allowing coupling said credit card into a specified receiving element to read information from the credit card package indicative of a credit card, and having at least two readable areas that are each readable from a surface of the credit card, wherein said readable areas include a first reading strip on a first portion of the credit card package, and a second reading strip on a second portion of the credit card package, where the first reading strip is located in a location so that said first reading strip is read from the credit card when the credit card is coupled in said receiving element in a first orientation, and the second reading strip is read from said credit card when the credit card is coupled in said receiving element in a second orientation, and wherein the first reading strip has data for a first function, and the second reading strip has data for a second function different from the first function, further comprising an electronic device, where said electronic device stores data associated with use of the credit card-, further comprising an automatic position detecting part, which automatically detects a position of said credit card, wherein said electronic device automatically stores a balance of said credit card, and adjusts said balance based on credit card card usage, wherein said electronic device automatically converts said balance in said device to another currency based on said position detected by said automatic position detecting part.

18. A method comprising
using a credit card that is in a credit card package in a first orientation, to carry out a first function associated with first data stored by the credit card; and
using the credit card in a second orientation, to carry out a different function associated with second data stored in the credit card,
wherein said first function is a credit card function and said second function is an ATM function, and said ATM function requires a password to be entered into the credit card in order for the credit card package to function as an ATM card, but allowing said other functions of the credit card package without entering said password.

19. A method as in claim 18, further comprising an automatic position detecting part, which automatically detects a position.

20. A method as in claim 18, further comprising automatically storing a balance, and adjusting said balance based on usage.

21. A method, comprising using a credit card that is in a credit card package in a first orientation, to carry out a first function associated with first data stored by the credit card; and sing the credit card in a second orientation, to carry out a different function associated with second data stored in the credit card, further comprising automatically storing a balance, and adjusting said balance based on usage further comprising an automatic position detecting part, which automatically detects a position, and automatically converting said balance to another currency based on said position that was detected.

22. A method, comprising using a credit card device, to carry out a credit card function at a first time, and to carry out an ATM function at a second time, wherein said using comprises using the credit card without entering a personal identification number at said first time, and using a same credit card to carry out the ATM function at said second time and requiring entry of said personal identification number into said credit card device at said second time to carry out said ATM function, wherein said credit card device will not allow carrying out said ATM function without entering said personal identification number into said credit card.

* * * * *